(12) United States Patent
Nasca et al.

(10) Patent No.: US 11,897,408 B2
(45) Date of Patent: Feb. 13, 2024

(54) INFLATABLES USED TO ADDRESS ROLLOVER

(71) Applicant: GM GLOBAL TECHNOLOGY OPERATIONS LLC, Detroit, MI (US)

(72) Inventors: Jeff E. Nasca, Bloomfield Township, MI (US); Daniel W. Booth, Bloomfield Hills, MI (US); Wonhee M. Kim, Royal Oak, MI (US); Peter J. Gareau, Warren, MI (US); William J. Barnes, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/481,991

(22) Filed: Sep. 22, 2021

(65) Prior Publication Data
US 2023/0091405 A1    Mar. 23, 2023

(51) Int. Cl.
*B60R 21/213* (2011.01)
*B60R 21/214* (2011.01)
*B60R 21/2338* (2011.01)
*B60R 21/233* (2006.01)
*B60R 21/00* (2006.01)
(Continued)

(52) U.S. Cl.
CPC .......... *B60R 21/214* (2013.01); *B60R 21/213* (2013.01); *B60R 21/233* (2013.01); *B60R 21/2338* (2013.01); *B60R 2021/0018* (2013.01); *B60R 2021/0048* (2013.01); *B60R 2021/0414* (2013.01); *B60R 2021/0442* (2013.01); *B60R 2021/23192* (2013.01); *B60R 2021/23382* (2013.01)

(58) Field of Classification Search
CPC . B60R 21/213; B60R 21/214; B60R 21/2338; B60R 21/233; B60R 2021/23382; B60R 2021/0048; B60R 2021/0414; B60R 2021/23192; B60R 2021/0442; B60R 2021/0018
USPC ............................................ 280/730.1, 743.2
See application file for complete search history.

(56) References Cited

U.S. PATENT DOCUMENTS 5,775,726 A * 7/1998 Timothy ............. B60R 13/0212
280/730.1
6,217,061 B1 * 4/2001 Harland .................. B60R 21/04
280/751
(Continued)

FOREIGN PATENT DOCUMENTS

CN   211893136 U  * 11/2020
EP       1386791 B1    4/2009
(Continued)

*Primary Examiner* — Keith J Frisby
(74) *Attorney, Agent, or Firm* — Harness, Dickey & Pierce, P.L.C.

(57) ABSTRACT

A vehicle includes a passenger compartment having a roof structure having a front header, a pair of side headers and a rear header. A headliner is disposed beneath the roof structure. At least one inflatable bladder is disposed along at least one of the front header, the pair of side headers and the rear header. The at least one inflatable bladder is connected to an inflator. A rib structure is disposed adjacent to the at least one inflatable bladder. The inflatable bladder inflates to a maximum height of 12 cm below the at least one of the front header, the pair of side headers and the rear header.

16 Claims, 11 Drawing Sheets

(51) Int. Cl.
    *B60R 21/231*    (2011.01)
    *B60R 21/04*     (2006.01)

(56) References Cited

U.S. PATENT DOCUMENTS

| | | | |
|---|---|---|---|
| 6,457,740 B1 * | 10/2002 | Vaidyaraman | ........ B60R 21/232 |
| | | | 280/730.2 |
| 7,222,877 B2 | 5/2007 | Wipasuramonton et al. | |
| 10,687,634 B1 | 6/2020 | Kim et al. | |
| 2002/0190508 A1 | 12/2002 | Jost | |
| 2003/0132619 A1 * | 7/2003 | Winarto | ................ B60R 21/232 |
| | | | 280/730.2 |
| 2003/0197354 A1 | 10/2003 | Beland et al. | |

FOREIGN PATENT DOCUMENTS

| | | | |
|---|---|---|---|
| JP | 2002172994 A | * | 6/2002 |
| JP | 2008018805 A | | 1/2008 |
| JP | 2011051513 A | | 3/2011 |
| JP | 2013203127 A | | 10/2013 |
| KR | 20180066903 A | * | 6/2018 |

\* cited by examiner

INFLATABLES USED TO ADDRESS ROLLOVER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a headliner for a vehicle passenger compartment that expands via the use of an inflatable bladder/airbag only when an incident does occur (like an airbag), thus making it possible to raise the entire headliner up/away and increase head clearance to the vehicle occupants when the inflatable bladder(s) is (are) deactivated.

Based on the need to meet the requirement of Federal Motor Vehicle Safety Standard (FMVSS) 201U, a headliner or a like overhead trim require multiple foam shapes/counter measure/and/or space created between the exterior sheet metal and the backside of the headliner surface. This current execution with its stationary foam parts/counter measure/ and or space gap forces the headliner to intrude into the interior occupant space.

SUMMARY

The present disclosure is direct to utilizing an inflatable bladder/airbags/heat pressed bladder layers to replace the current stationary foam pieces/counter measures and/or space found in current headliner executions. These bladder/ airbags would inflate upon impact and would retain inflation needed to meet FMVSS 201U requirements in case of an event. Prior to an impact the combined inflatable bladder and other thinner countermeasures would be thinner in overall section than the stationary 3D foam parts/counter measures and/or open space/gap previously used to meet the FMVSS 201U requirements found on current vehicles, thus increasing headroom. With its thin profile, this concept will enable increased headroom since the need to meet FMVSS 201U is required only in the event of an accident/rollover. To meet low-speed non-deployment roll-over requirements 4 mm of plastic ribs are provided.

According to an aspect of the present disclosure, a vehicle includes a passenger compartment having a roof structure having a front header, a pair of side headers and a rear header. A headliner is disposed beneath the roof structure. At least one inflatable bladder is disposed along at least one of the front header, the pair of side headers and the rear header. The at least one inflatable bladder is connected to an inflator. A rib structure is disposed adjacent to the at least one inflatable bladder.

According to a further aspect of the present disclosure, the inflatable bladder inflates to a maximum height of 12 cm below the at least one of the front header, the pair of side headers and the rear header.

According to yet another aspect of the present disclosure, a headliner is disposed beneath the sheet metal roof structure and includes an inflatable bladder having a matrix of separate chambers spaced laterally and longitudinally throughout the headliner. The inflatable bladder is connected to an inflator, wherein in an inflated condition the matrix of isolated chambers defines a plurality of bumps both laterally and longitudinally spaced throughout the headliner.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
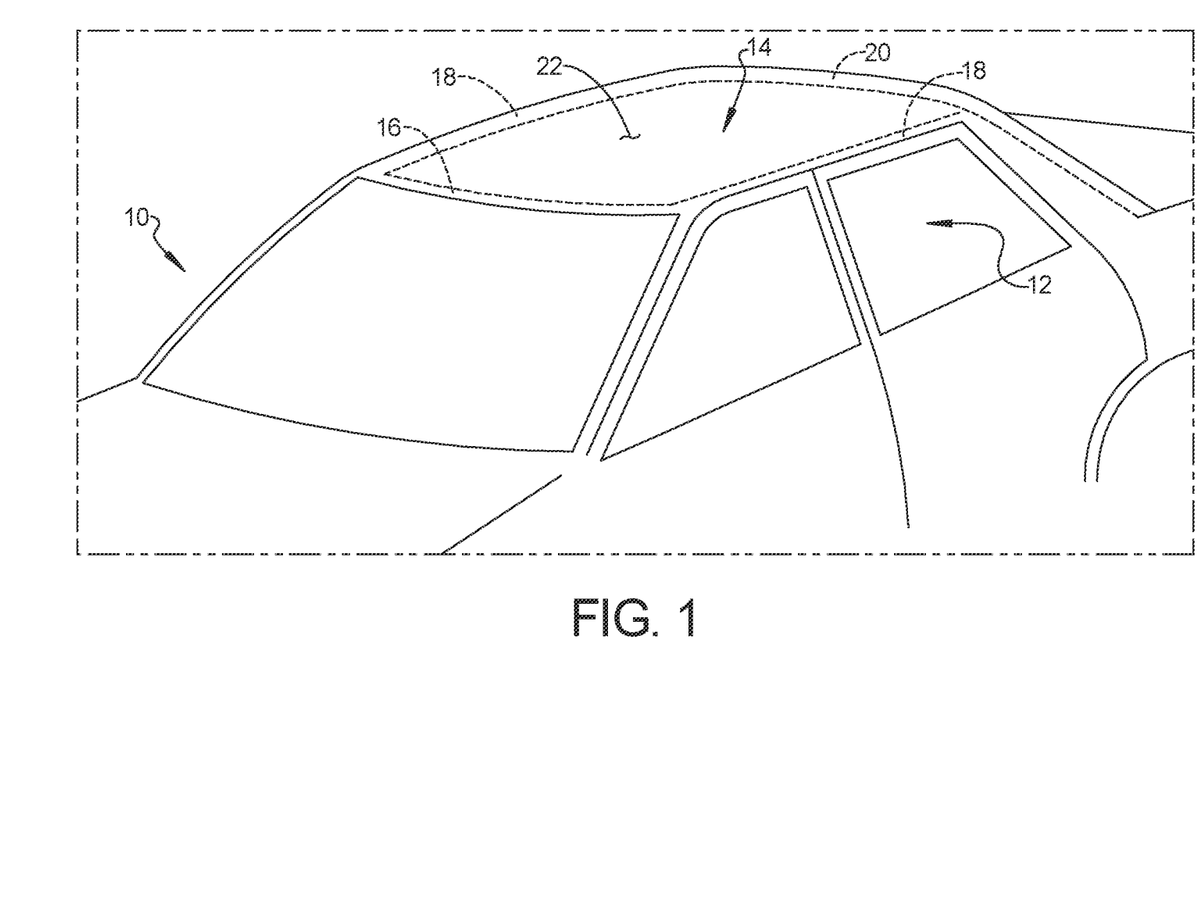
FIG. 1 is an exemplary perspective view of a vehicle passenger compartment illustrating the different locations where an inflatable bladder can be implemented according to the principles of the present disclosure.

With reference to FIG. 1, a vehicle 10 is shown including a vehicle passenger compartment 12 that illustrates the different locations where an inflatable bladder can be implemented to replace the current stationary foam pieces/counter measures found in current headliner executions. As shown, the passenger compartment 12 includes a roof structure 14 having a front header 16, a pair of side headers 18 and a rear header 20. It should be understood that the exemplary vehicle passenger compartment 12 can take on various forms including only a single row of seats or multiple rows of seats. As will described herein, an inflatable bladder can be implemented along the front header 16, along the pair of side headers 18, along the rear header 20 as well as throughout a headliner 22 to replace the current stationary foam pieces/counter measures found in current headliner executions in order to reduce an amount of protrusion into the passenger compartment 12.

Figure 2:
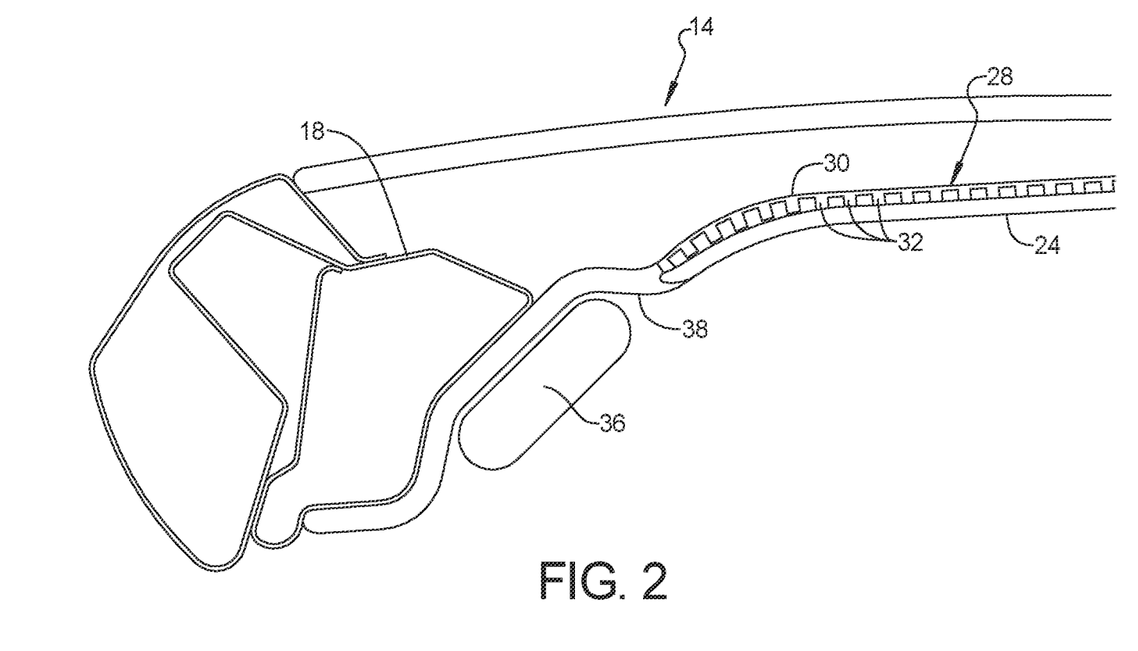
FIG. 2 is a cross-sectional view of an inflatable bladder mounted in a side surface of a headliner substrate in an un-deployed state.
Figure 3:
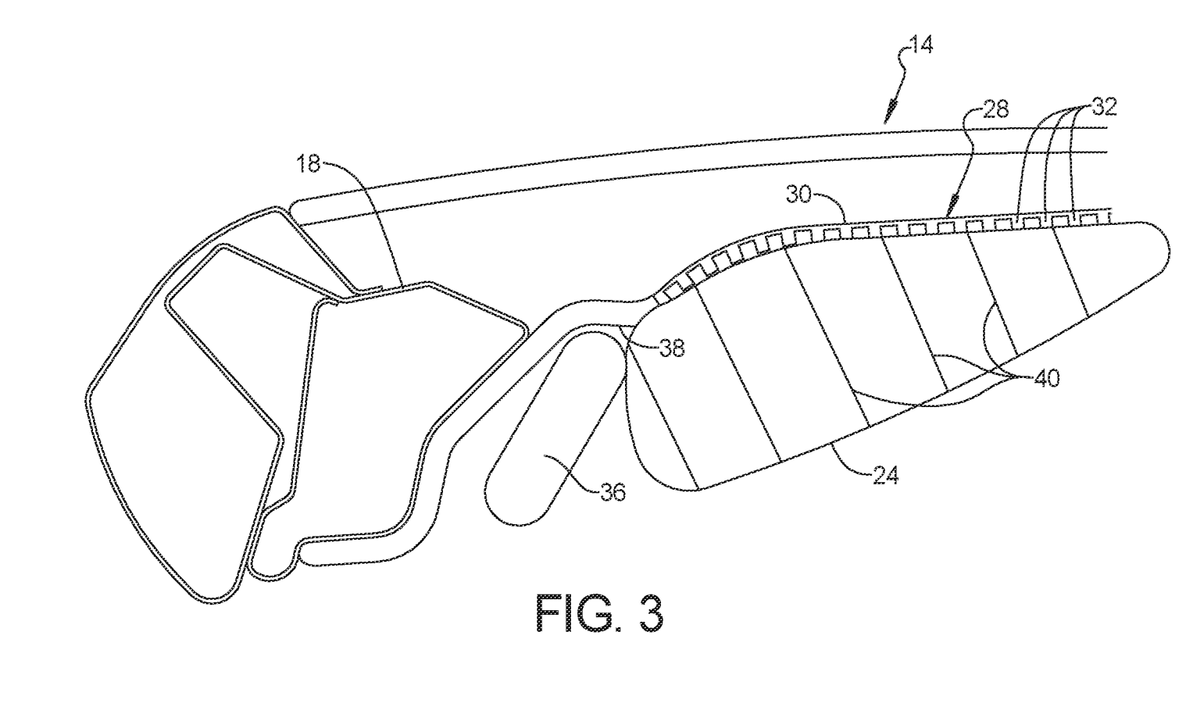
FIG. 3 is a cross-sectional view of the inflatable bladder of FIG. 2 in a deployed state.

With reference to FIGS. 2 and 3, a side header 18 of a roof structure 14 is shown including an inflatable bladder 24 adjacent to the side header 18. The inflatable bladder 24 is connected to an inflator 26 (See FIG. 11). A rib structure 28 is disposed between the inflatable bladder 24 and the roof structure 14. The rib structure 28 can include a substrate 30 with a plurality of ribs 32 that can be made from a collapsible material such as but not limited to multi-ply thermoplastic polymers including Polypropylene. In addition these polymers or other materials can be processed in different ways such as injection molded or EPP (Expanded Polypropylene) to produce a material that can act as a stiffener under certain conditions and as a collapsible material under other conditions. The ribs 32 can have a height of between 3 and 8 mm and more preferably about 4 mm. The inflatable bladder 24 can be fixed to the roof structure 14 along both side edges and sized and shaped to protect the user's head from impacting the side header 18 in a deployed state. The inflatable bladder inflates to a maximum height of 12 cm below the at least one of the front header, the pair of side headers and the rear header. The vehicle 10 can be implemented with an event sensing system 34 (See FIG. 11) that receives signals from various known sensors for sensing one of an impact or a rollover condition and activating the inflator 26, as is well known in the art. With reference to FIG. 3, the inflatable bladder 24 is shown in an inflated state wherein the inflatable bladder 24 extends downward from the roof structure 14 in order to provide added cushion to the side header 18 and the side handle 36 that is mounted to the roof structure 14. The headliner 22 can include a fabric covering 38 that covers the inflatable bladder 24. The fabric covering 38 can be an expandable material or can include a tear line or multiple tear lines to allow the inflatable bladder 24 to be deployed through the fabric covering 38. The implementation of the rib structure 28 and inflatable bladder 24 allow a reduced protrusion into the passenger compartment 12 as compared to previous stationary foam parts and countermeasures. The estimated reduced protrusion can be approximately 15-20 mm as compared to previous stationary foam parts and countermeasures. The inflatable bladder 24 can include a plurality of internal tethers 40 that have desired lengths in order to control the shape and stiffness of the bladder 24. The tethers 40 can be implemented as disclosed in commonly assigned U.S. Pat. No. 10,687,634 which is herein incorporated by reference in its entirety.

Figure 4:
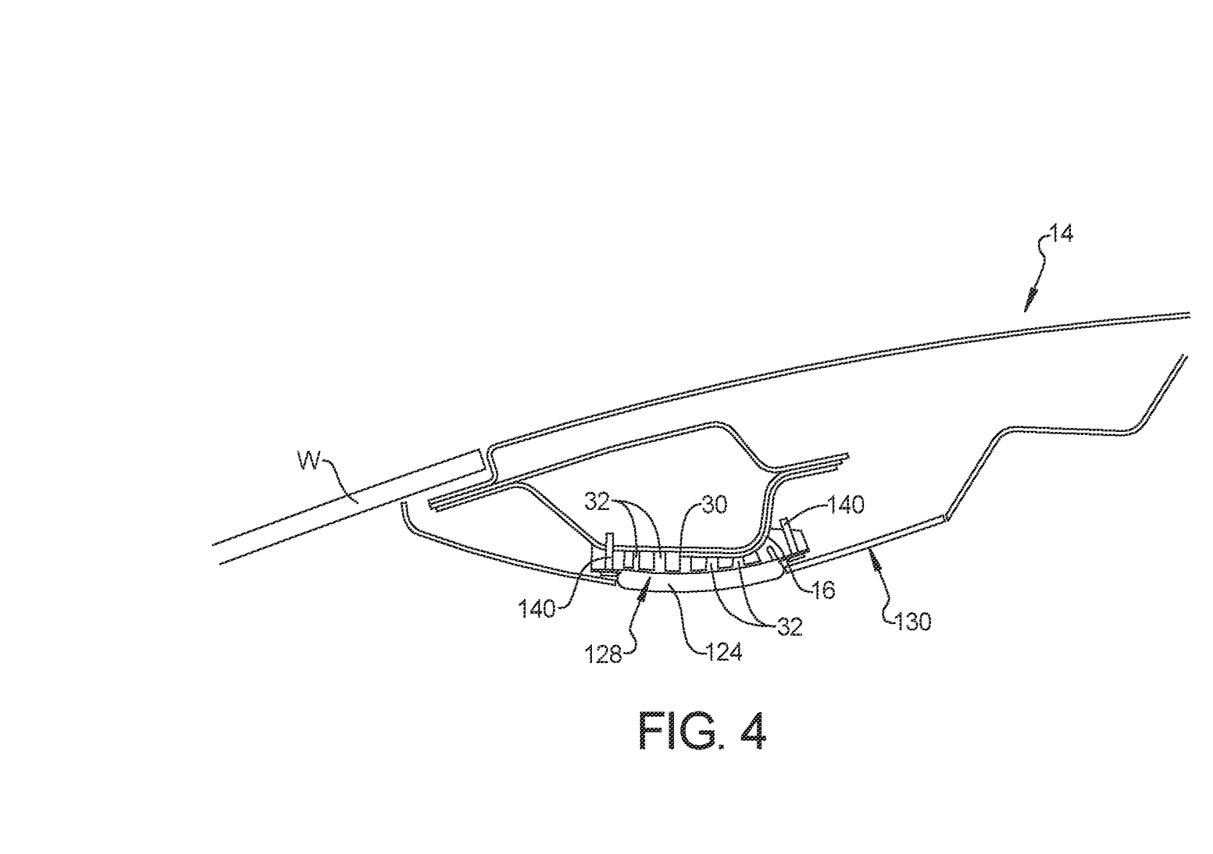
FIG. 4 is a cross-sectional view of a front header having an inflatable bladder implemented over the top of a rib structure according to the principles of the present disclosure.
Figure 11:
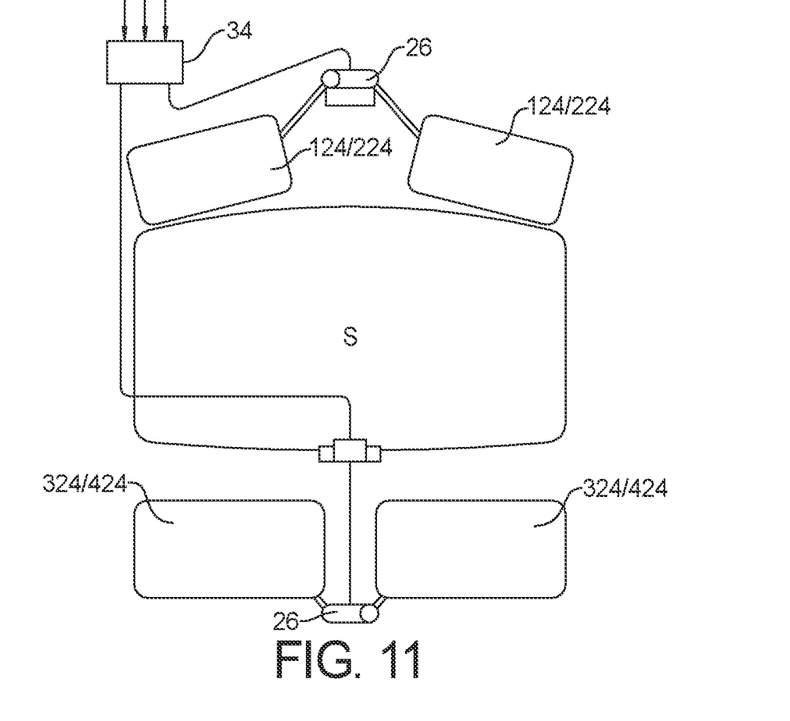
FIG. 11 is a schematic view of an exemplary vehicle passenger compartment with inflatable bladders disposed along the front and rear headers according to the principles of the present disclosure.

With reference to FIG. 4, a front header 16 of a roof structure 14 is shown including an inflatable bladder 124 adjacent to the front header 16. A windshield W is supported by the front header 16. The inflatable bladder 124 is connected to an inflator 26 (as illustrated in FIG. 11). A rib structure 128 is disposed between the inflatable bladder 124 and the front header 16. The rib structure 128 can include a substrate 30 with a plurality of ribs 32 that can be made from a collapsible material such as but not limited to a collapsible material such as but not limited to multi-ply thermoplastic polymers including Polypropylene. In addition these polymers or other materials can be processed in different ways such as injection molded or EPP (Expanded Polypropylene) to produce a material that can act as a stiffener under certain conditions and as a collapsible material under other conditions. The ribs 32 can have a height of between 3 and 8 mm and more preferably about 4 mm. The inflatable bladder 124 can be fixed to the front header 16 along both side edges by fasteners 140 and sized and shaped to provide added cushion to the front header 16 in a deployed state. The inflatable bladder inflates to a maximum height of 12 cm below the at least one of the front header, the pair of side headers and the rear header. The vehicle 10 can be implemented with an event sensing system 34 for sensing one of an impact or a rollover condition and activating the inflator 26, as is well known in the art. In an inflated state, the inflatable bladder 124 extends downward from the front header 16 in order to provide added cushion to the front header 16 of the roof structure 14. A trim member 130 can be implemented over the top of the inflatable bladder 124 so as to extend downward with the inflatable bladder when the inflatable bladder 124 is deployed. The implementation of the rib structure 28 and un-deployed inflatable bladder 124 allow a reduced protrusion into the passenger compartment 12 as compared to previous stationary foam parts and countermeasures. The estimated reduced protrusion can be at least 10 mm as compared to previous stationary foam parts and countermeasures. The inflatable bladder 124 can also include a plurality of internal tethers, similar to those shown in FIG. 3, that have desired lengths in order to control the shape and stiffness of the bladder 124. The tethers can be implemented as disclosed in commonly assigned U.S. Pat. No. 10,687,634 which is herein incorporated by reference in its entirety.

Figure 5:
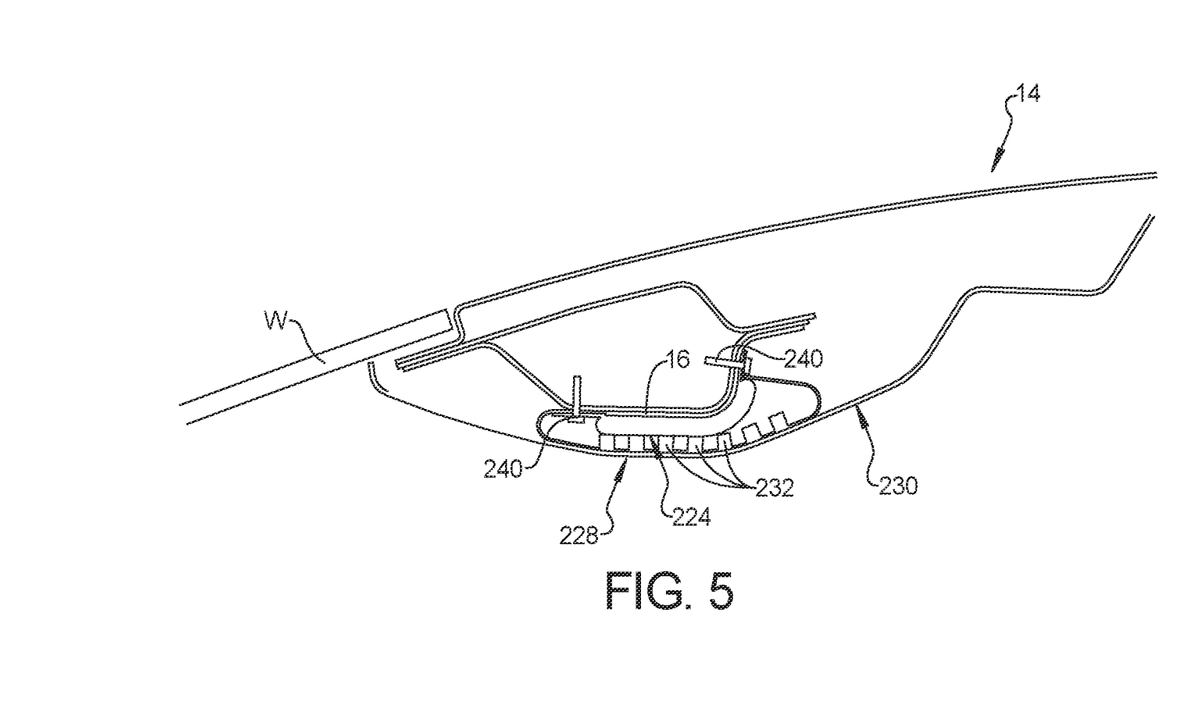
FIG. 5 is a cross-sectional view of a front header having an inflatable bladder implemented underneath a rib structure according to the principles of the present disclosure.

With reference to FIG. 5, a front header 16 of a roof structure 14 is shown including an inflatable bladder 224 adjacent to the front header 16. A windshield W is supported by the front header 16. The inflatable bladder 224 is connected to an inflator 26 (as shown in FIG. 11). A rib structure 228 can be integrally formed with a trim member 230 disposed over the top of the inflatable bladder 224. The rib structure 228 can include a plurality of ribs 232 that can be made from a collapsible material such as but not limited to multi-ply thermoplastic polymers including Polypropylene. In addition these polymers or other materials can be processed in different ways such as injection molded or EPP (Expanded Polypropylene) to produce a material that can act as a stiffener under certain conditions and as a collapsible material under other conditions. The ribs 232 can have a height of between 3 and 8 mm and more preferably about 4 mm. The inflatable bladder 224 can be fixed to the front header 16 along both side edges by fasteners 240 and sized and shaped to protect the user's head from impacting the front header 16 in a deployed state. The vehicle 10 can be implemented with an event sensing system 34 (see FIG. 11) for sensing one of an impact or a rollover condition and activating the inflator 26, as is well known in the art. In an inflated state, the inflatable bladder 224 extends downward from the front header 16 in order to provide added cushion to the front header 16 of the roof structure 14. The implementation of the rib structure 228 and inflatable bladder 224 allows a reduced protrusion into the passenger compartment 12 as compared to previous stationary foam parts and countermeasures. The estimated reduced protrusion can be at least 6 mm as compared to previous stationary foam parts and countermeasures.

Figure 6:
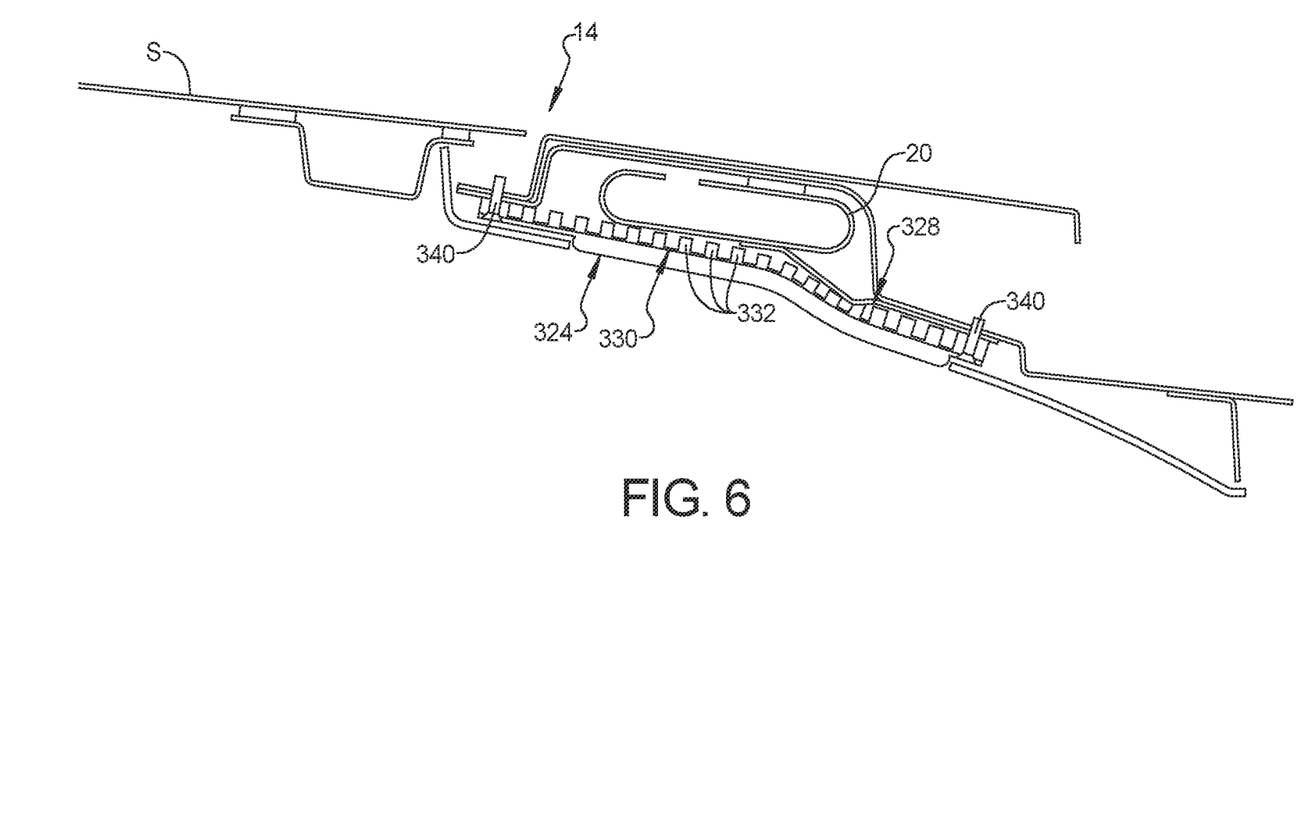
FIG. 6 is a cross-sectional view of a rear header having an inflatable bladder implemented over the top of a rib structure in an un-deployed state.
Figure 7:
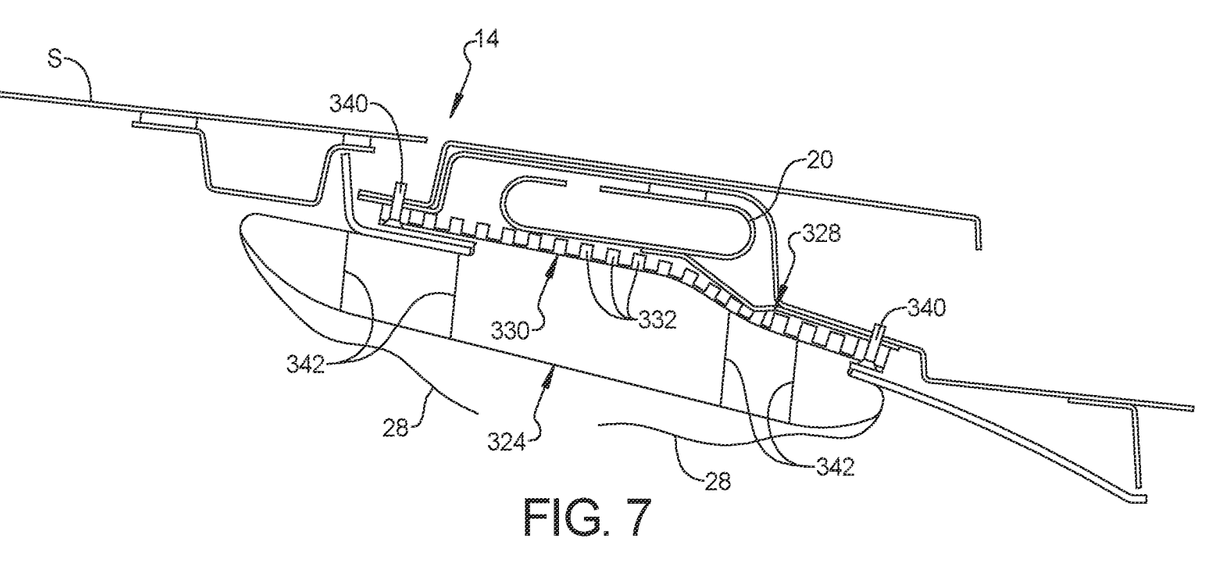
FIG. 7 is a cross-sectional view of a rear header having an inflatable bladder implemented over the top of a rib structure in a deployed state.

With reference to FIGS. 6 and 7, a rear header 20 of a roof structure 14 is shown including an inflatable bladder 324 adjacent to the rear header 20. A sun roof S can be supported by the rear header 20. The inflatable bladder 324 is connected to an inflator 26 (as shown in FIG. 11). A rib structure 328 is disposed between the inflatable bladder 324 and the rear header 20. The rib structure 328 can include a substrate 330 with a plurality of ribs 332 that can be made from a collapsible material such as but not limited to multi-ply thermoplastic polymers including Polypropylene. In addition these polymers or other materials can be processed in different ways such as injection molded or EPP (Expanded Polypropylene) to produce a material that can act as a stiffener under certain conditions and as a collapsible material under other conditions. The ribs 332 can have a height of between 3 and 8 mm and more preferably about 4 mm. The inflatable bladder 324 can be fixed to the roof structure 14 along both side edges by fasteners 340 and sized and shaped to protect the user's head from impacting the rear header 20 in a deployed state. The vehicle 10 can be implemented with an event sensing system 34 (see FIG. 11) for sensing one of an impact or a rollover condition and activating the inflator 26, as is well known in the art. With reference to FIG. 7, the inflatable bladder 324 is shown in an inflated state wherein the inflatable bladder 324 extends downward from the roof structure 14 in order to provide added cushion to rear header 20 of the roof structure 14. The headliner 22 can include a fabric covering 28 that covers the inflatable bladder 324. The fabric covering 28 can be stretchable material or can include a tear line or multiple tear lines to allow the inflatable bladder 324 to be deployed through the fabric covering 28. The implementation of the rib structure 328 and inflatable bladder 324 allow a reduced protrusion into the passenger compartment 12 as compared to previous stationary foam parts and countermeasures. The estimated reduced protrusion can be approximately 20 mm as compared to previous stationary foam parts and countermeasures. The inflatable bladder 324 can include a plurality of internal tethers 342 that have desired lengths in order to control the shape and stiffness of the bladder 324. The tethers 342 can be implemented as disclosed in commonly assigned U.S. Pat. No. 10,687,634 which is herein incorporated by reference in its entirety.

Figure 8:
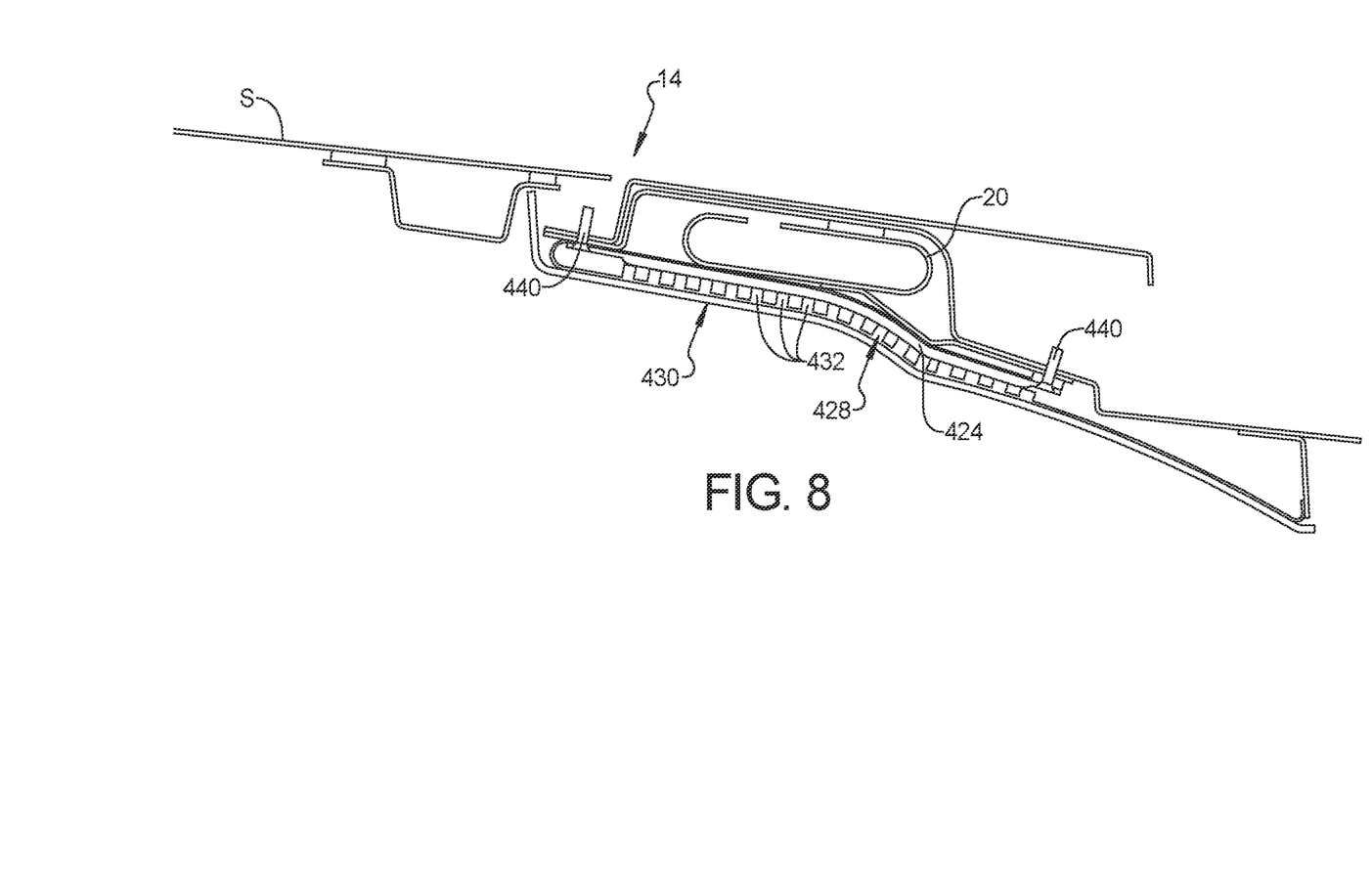
FIG. 8 is a cross-sectional view of a rear header having an inflatable bladder implemented underneath a rib structure in an un-deployed state.
Figure 9:
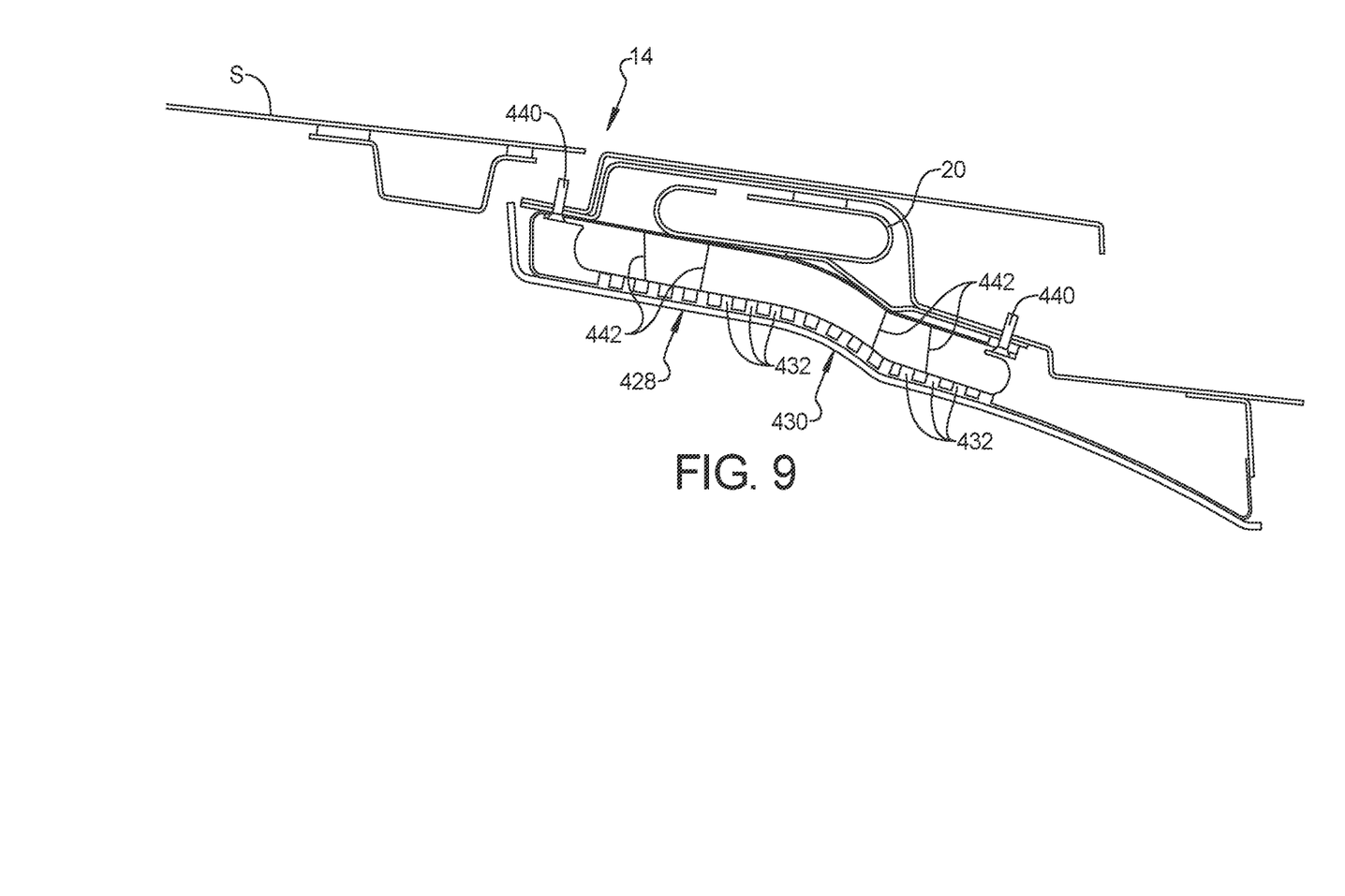
FIG. 9 is a cross-sectional view of a rear header having an inflatable bladder implemented underneath a rib structure in a deployed state.

With reference to FIGS. 8 and 9, a rear header 20 of a roof structure 14 is shown including an inflatable bladder 424 adjacent to the rear header 20. The inflatable bladder 424 is connected to an inflator 26 (see FIG. 11). A rib structure 428 can be formed or molded into the backside of a trim surface 430. The rib structure 428 can include a plurality of ribs 432 that can be made from a collapsible material such as but not limited to multi-ply thermoplastic polymers including Polypropylene. In addition these polymers or other materials can be processed in different ways such as injection molded or EPP (Expanded Polypropylene) to produce a material that can act as a stiffener under certain conditions and as a collapsible material under other conditions. The ribs 432 can have a height of between 3 and 8 mm and more preferably about 4 mm. The inflatable bladder 424 can be fixed to the roof structure 14 along both side edges by fasteners 440 and sized and shaped to provide added cushion to the rear header 20 in a deployed state. The vehicle 10 can be implemented with an event sensing system 34 (see FIG. 11) for sensing one of an impact or a rollover condition and activating the inflator 26 (see FIG. 11), as is well known in the art. With reference to FIG. 9, the inflatable bladder 424 is shown in an inflated state wherein the inflatable bladder 424 extends downward from the roof structure 14 in order to provide added cushion to the rear header 20 of the roof structure 14. The trim surface 430 extends downward with the inflatable bladder 424 when the inflatable bladder 424 is deployed. The implementation of the rib structure 428 and inflatable bladder 424 allow a reduced protrusion into the passenger compartment 12 as compared to previous stationary foam parts and countermeasures. The estimated reduced protrusion can be approximately 20 mm as compared to previous stationary foam parts and countermeasures. The inflatable bladder 424 can include a plurality of internal tethers 442 that have desired lengths in order to control the shape and stiffness of the bladder 424. The tethers 442 can be implemented as disclosed in commonly assigned U.S. Pat. No. 10,687,634 which is herein incorporated by reference in its entirety.

Figure 10:
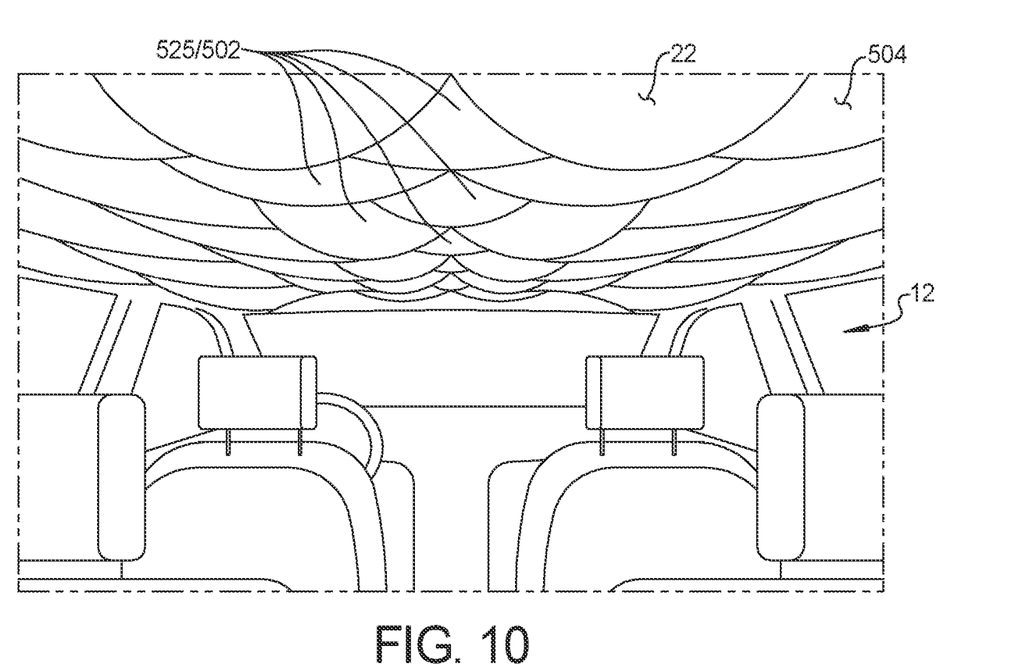
FIG. 10 is a perspective view of a vehicle inflated headliner shown in a deployed state.

With reference to FIG. 10, the passenger compartment 12 is shown including a headliner 22 disposed beneath the roof structure 14 and an inflatable bladder including a matrix of isolated chambers 525 spaced laterally and longitudinally throughout the headliner 22. The inflatable bladder is connected to an inflator 26, wherein in an inflated condition the matrix of isolated chambers 525 defines a plurality of bumps 502 both laterally and longitudinally spaced throughout the headliner 22. The headliner 22 includes a fabric 504 covering the inflatable bladder. In a deployed state, as shown in FIG. 10, the headliner 22 can have between 2 and 6 separate bumps 502 in a lateral direction of the vehicle 10 and between 2 and 12 separate bumps 502 in a longitudinal direction of the vehicle 10. The center section headliner bumps 502 could expand down (in conjunction with an optional console airbag expanding upwards) to mitigate occupant cross-car heads colliding during an accident as a replacement for full-size inner seat-side airbags. The isolated chambers 525 of the inflatable bladder can include a plurality of internal tethers that have desired lengths in order to control the shape and stiffness of the bladder isolated chambers 525. The tethers can be implemented as disclosed in commonly assigned U.S. Pat. No. 10,687,634 which is herein incorporated by reference in its entirety.

Figure 12:
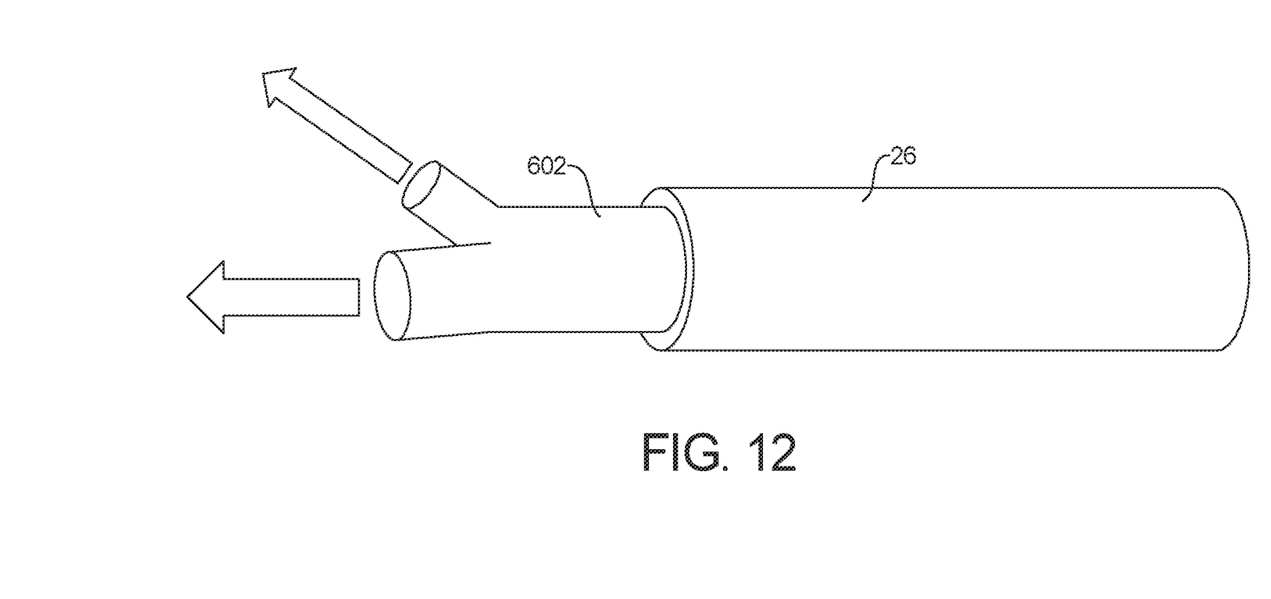
FIG. 12 is a schematic view of an exemplary y-manifold for simultaneously delivering inflation gasses to multiple inflatable bladders.

Each of the inflatable bladders 24, 124, 224, 324, 424 and 524 can each be connected to an inflator 26 that can be activated by a controller 34 in response to a detected impact or rollover event. The controller 34 can be utilized to detect the presence of a passenger within different areas of the passenger compartment 12 and activate or deactivate the inflators 26 associated with the inflatable bladders of the different areas depending upon whether they are occupied or not. Alternatively, two or more inflatable bladders 24, 124, 224, 324, 424 and 524 can be connected to a single inflator 26 via a Y-manifold 602 as shown in FIG. 12 along with the controller 34 that can be utilized to activate or deactivate the different inflatable bladders depending upon whether they are in an area of the vehicle 10 that is occupied or not.

This present disclosure uses all surfaces that are impacted by the Federal Motor Vehicle Safety Standards (FMVSS) Section 201U to create an inflatable bladder/air bag shapes to:
1) Reduce the sectional interior surface intrusion/diagonal head clearance for all FMVSS 201U surfaces at rest (won't expand until activated/needed).
2) Replace some or all stationary foam parts/counter measurements/or open space gap used to meet FMVSS 201U requirements while increasing headroom.
3) Use of plastic ribbing or the like to meet low speed/non-deployment rollover requirements.
4) Each zone/section could be tuned to address any possible impact scenario.
5) passenger sensor could be used to identify who is in a vehicle and inflate the bladder/air bag in the correct spots (for entire headliner concept). Control valves and Y-manifolds can be used to activate and deactivate different inflatable bladders. Accordingly, the bladders can be inflated separately using their own inflators or can be inflated simultaneously while connected to 1 inflator.
6) Option to add tensegrity to the bladders to aid in controlling the direction and shape using internal tethers.

7) Center section headliner bumps 502 could expand down (in conjunction with a console airbag expanding upwards) to mitigate occupant cross-car heads colliding during an accident as a replacement for full-size inner seat-side airbags.
8) The deployment would be connected to the vehicle sensors that would identify the location of the impending crash (think sequence of the event) to be used to trigger the appropriate activation.
9) Option to use multiple "pressure sources/pyrotechnics and/or compressed gas" to expand the bladder(s) in conjunction with the sensor activation.
10) Use of a torque monitored fastener during assembly to insure proper retainment of the system.
11) Design for release (2-way valve): a) One-way to pressurize the system b) One that re-stabilizes with any reactionary pressure against the bladder/airbag.
12) The bladders and inflator unit can be attached either to the body structure (as shown in the drawings) and/or can be attached to the interior trim as a unit and then attached to the body structure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A vehicle, comprising:
a passenger compartment having a roof structure having a header;
a headliner disposed beneath the roof structure;
at least one inflatable bladder having an uninflated state and an inflated state wherein in both the uninflated state and the inflated state, the at least one inflatable bladder is disposed in a covering relationship over the header and the at least one inflatable bladder being connected to an inflator; and
a rib structure including a plurality of ribs in contact with the at least one inflatable bladder in both the uninflated state and the inflated state and sandwiched between the at least one inflatable bladder and the header in both the uninflated state and the inflated state.

2. The vehicle according to claim 1, further comprising an event sensing system for sensing one of an impact or a rollover condition and activating the inflator in response to a sensed impact or rollover condition.

3. The vehicle according to claim 1, wherein the rib structure includes the plurality of ribs disposed on a substrate.

4. The vehicle according to claim 3, wherein the plurality of ribs are made from a thermoplastic polymer.

5. The vehicle according to claim 4, wherein the plurality of ribs have a height of between 3 and 8 mm.

6. The vehicle according to claim 1, wherein the rib structure is disposed between the header and the at least one inflatable bladder.

7. The vehicle according to claim 1, wherein the at least one inflatable bladder includes a plurality of inflatable bladders along each of a front header, a pair of side headers and a rear header and the plurality of inflatable bladders being connected to the inflator by a Y-manifold.

8. The vehicle according to claim 1, wherein the at least one inflatable bladder includes a plurality of internal tethers.

9. The vehicle according to claim 1, wherein the at least one inflatable bladder inflates to a maximum height of 12 cm below the header.

10. A vehicle, comprising:
a passenger compartment having a roof structure having a header;
a headliner disposed beneath the roof structure;
at least one inflatable bladder having an uninflated state and an inflated state wherein in both the uninflated state and the inflated state, the at least one inflatable bladder is disposed in a covering relationship over the header and the at least one inflatable bladder being connected to an inflator;
a rib structure in contact with the at least one inflatable bladder in both the uninflated state and the inflated state and sandwiched between the at least one inflatable bladder and the header in both the uninflated state and the inflated state, wherein the rib structure includes a plurality of ribs that have a height of between 3 and 8 mm; and
wherein the at least one inflatable bladder inflates to a maximum height of 12 cm below the header.

11. The vehicle according to claim 10, further comprising an event sensing system for sensing one of an impact or a rollover condition and activating the inflator in response to a sensed impact or rollover condition.

12. The vehicle according to claim 10, wherein the rib structure is disposed between the header and the at least one inflatable bladder in both the uninflated state and the inflated state.

13. The vehicle according to claim 11, wherein the at least one inflatable bladder includes a plurality of inflatable bladders along each of a front header, a pair of side headers and a rear header and the plurality of inflatable bladders being connected to the inflator.

14. The vehicle according to claim 10, wherein the at least one inflatable bladder includes a plurality of internal tethers.

15. A vehicle, comprising:
a passenger compartment having a roof structure having a header;
at least one inflatable bladder having an uninflated state and an inflated state wherein in both the uninflated state and the inflated state, the at least one inflatable bladder is disposed in a covering relationship over the header with a pair of opposite side edges of the at least one inflatable bladder being fixed to the roof structure and the at least one inflatable bladder being connected to an inflator; and
a rib structure including a plurality of ribs in contact with the at least one inflatable bladder in both the uninflated state and the inflated state and wherein the at least one inflatable bladder is sandwiched between the plurality of ribs and the header in both the uninflated state and the inflated state, wherein the plurality of ribs have a height of between 3 and 8 mm.

16. The vehicle according to claim 15, wherein the plurality of ribs are made from a thermoplastic polymer.

* * * * *